United States Patent
Saito et al.

(10) Patent No.: US 9,245,570 B2
(45) Date of Patent: Jan. 26, 2016

(54) REPRODUCING APPARATUS AND REPRODUCING METHOD

(71) Applicant: Sony Corporation, Tokyo (JP)

(72) Inventors: Kimihiro Saito, Kanagawa (JP); Koji Sekiguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/320,856

(22) Filed: Jul. 1, 2014

(65) Prior Publication Data

US 2015/0036472 A1 Feb. 5, 2015

(30) Foreign Application Priority Data

Jul. 30, 2013 (JP) ................................. 2013-157674

(51) Int. Cl.
*G11B 7/00* (2006.01)
*G11B 7/125* (2012.01)
*G11B 7/005* (2006.01)

(52) U.S. Cl.
CPC ................ *G11B 7/125* (2013.01); *G11B 7/005* (2013.01)

(58) Field of Classification Search
None
See application file for complete search history.

(56) References Cited

U.S. PATENT DOCUMENTS

| | | | |
|---|---|---|---|
| 7,750,276 B2 * | 7/2010 | Miyamoto et al. | 250/201.5 |
| 8,023,390 B2 * | 9/2011 | Shimano et al. | 369/112.16 |
| 2006/0087959 A1 * | 4/2006 | Adachi et al. | 369/275.1 |
| 2009/0316539 A1 * | 12/2009 | Mikami et al. | 369/44.32 |
| 2010/0039917 A1 * | 2/2010 | Ide | 369/100 |
| 2011/0080815 A1 * | 4/2011 | Mikami et al. | 369/47.19 |
| 2011/0235485 A1 * | 9/2011 | Mikami | 369/44.37 |
| 2012/0213046 A1 * | 8/2012 | Yamazaki | 369/44.32 |
| 2013/0135978 A1 * | 5/2013 | Ide | 369/53.28 |
| 2014/0029405 A1 * | 1/2014 | Kurokawa et al. | 369/107 |
| 2014/0036651 A1 * | 2/2014 | Sekiguchi et al. | 369/116 |

FOREIGN PATENT DOCUMENTS

| | | |
|---|---|---|
| JP | 2008-065961 A | 3/2008 |
| JP | 2008-269680 A | 11/2008 |
| JP | 2013-054801 | 3/2013 |
| JP | 2013054801 A * | 3/2013 |

* cited by examiner

*Primary Examiner* — Brenda Bernardi
(74) *Attorney, Agent, or Firm* — Hazuki International, LLC

(57) ABSTRACT

Provided is a reproducing apparatus including: an optical system that obtains a signal light by radiating light emitted from a light source and generates a reference light from the light emitted from the light source, with respect to a recording medium, and that generates first to fourth groups of the signal light beams and the reference light beams, with respect to the superposed light in which the signal light and the reference light are superposed onto each other; a light receiving unit that receives light beams of the first to fourth groups of the signal light beams and the reference light beams respectively through first to fourth light receiving elements; and a reproduction signal generation circuit that calculates a first differential signal and a second differential signal, and that generates a reproduction signal by performing an arithmetic operation using the first and second differential signals.

9 Claims, 8 Drawing Sheets

IF PHASE $\phi$ OF ▨ PORTION IS 0,
PHASE $\psi$ OF ▧ PORTION BECOMES $4\pi nd/\lambda$

REPRODUCING APPARATUS AND REPRODUCING METHOD

CROSS REFERENCE TO RELATED APPLICATIONS

This application claims the benefit of Japanese Priority Patent Application JP 2013-157674 filed Jul. 30, 2013, the entire contents of which are incorporated herein by reference.

BACKGROUND

The present disclosure relates to a reproducing apparatus applied to reproduce an optical medium such as an optical disk, and a reproducing method.

For example, when reproducing a multilayer optical disk, there are high possibilities that a signal light amount reduces and an error occurs while reading a signal. There is a homodyne detection system that amplifies a detection signal using light interference (refer to Japanese Unexamined Patent Application Publication No. 2008-269680 and Japanese Unexamined Patent Application Publication No. 2008-65961).

In Japanese Unexamined Patent Application Publication No. 2008-269680 or Japanese Unexamined Patent Application Publication No. 2008-65961, it is designed to detect four groups, the phase differences of which differ by 90°, of signal light beams and reference light beams, as a homodyne system of detecting light, in which the signal light interferes with the reference light. Specifically, the groups, the phase differences of which are respectively set as 0°, 90°, 180°, and 270°, of the signal light beams and the reference light beams are respectively detected. Each detecting is performed by detecting light intensity in regard to the light in which the signal light interferes with the reference light.

Furthermore, Japanese Unexamined Patent Application Publication No. 2013-54801 discloses a reproducing apparatus by which it is possible to improve SNR of a reproduction signal compared to the apparatus using the homodyne detection method in the related art.

SUMMARY in an optical disk, a method (appropriately referred to a land and groove recording system) of recording data on both a groove track and a land track is desirable in order to increase recording capacity. The above-described Japanese Unexamined Patent Application Publication Nos. 2008-269680, 2008-65961, and 2013-54801 do not mention any land and groove recording system. In the case of the land and groove recording system, track pitch becomes narrow. Therefore, it is desirable that the crosstalk between the tracks can be canceled even in the homodyne detection method.

Accordingly, it is desirable to provide a reproducing apparatus and a reproducing method by which it is possible to employ the homodyne detection method and to favorably reproduce a land and groove recording type optical medium.

According to an embodiment of the present disclosure, there is provided a reproducing apparatus including: an optical system that obtains a signal light, to which both recording signals of a land and a groove are applied, by radiating light emitted from a light source and generates a reference light from the light emitted from the light source, with respect to a recording medium in which the signals are recorded in both the land and the groove, and that generates a first group, the phase difference of which is given by almost 0°, of the signal light and the reference light, a second group, the phase difference of which is given by almost 180°, of the signal light and the reference light, a third group, the phase difference of which is given by almost 90°, of the signal light and the reference light, and a fourth group, the phase difference of which is given by almost 270°, of the signal light and the reference light, with respect to the superposed light in which the signal light and the reference light are superposed onto each other; a light receiving unit that receives light of the first group of the signal light and the reference light through a first light receiving element, light of the second group of the signal light and the reference light through a second light receiving element, light of the third group of the signal light and the reference light through a third light receiving element, and light of the fourth group of the signal light and the reference light through a fourth light receiving element; and a reproduction signal generation circuit that calculates a first differential signal which is a difference between a first light receiving signal obtained from the first light receiving element and a second light receiving signal obtained from the second light receiving element, and a second differential signal which is a difference between a third light receiving signal obtained from the third light receiving element and a fourth light receiving signal obtained from the fourth light receiving element, and that generates a reproduction signal from which phase deviation of the reference light and phase offset of a value corresponding to a step between the land and the groove are removed, by performing an arithmetic operation using the first differential signal and the second differential signal.

According to the embodiment of the present disclosure, it is possible to favorably reproduce the land and groove recording type optical recording medium using the homodyne detection method. Accordingly, it is possible to further increase recording capacity.

DETAILED DESCRIPTION OF EMBODIMENTS

Embodiments described hereinafter are preferred specific examples of the present disclosure and are limited in various manners, the limitation being technically preferable. However, the scope of the present disclosure is not limited to the embodiments unless there is intent to limit the present disclosure.

The present disclosure will be described according to the following sequence.
1. Regarding Homodyne Detection Method in the Related Art
2. Example of Detection Method
3. Embodiment
4. Modification Example

1. Regarding Homodyne Detection Method in the Related Art

A homodyne detection method in the related art will be described before describing a reproducing method of an embodiment of the present disclosure. Hereinafter, a homodyne detection method using a so-called phase diversity system will be described as an example.

Four groups, the phase differences of which differ from each other by 90°, of signal light beams and reference light beams are used in the phase diversity system. Specifically, the groups, the phase differences of which are respectively adjusted as about 0°, 90°, 180°, and 270°, of the signal light beams and the reference light beams are respectively detected in the phase diversity system. Each detecting is performed by detecting light intensity in regard to the light in which the signal light interferes with the reference light.

Figure 1:
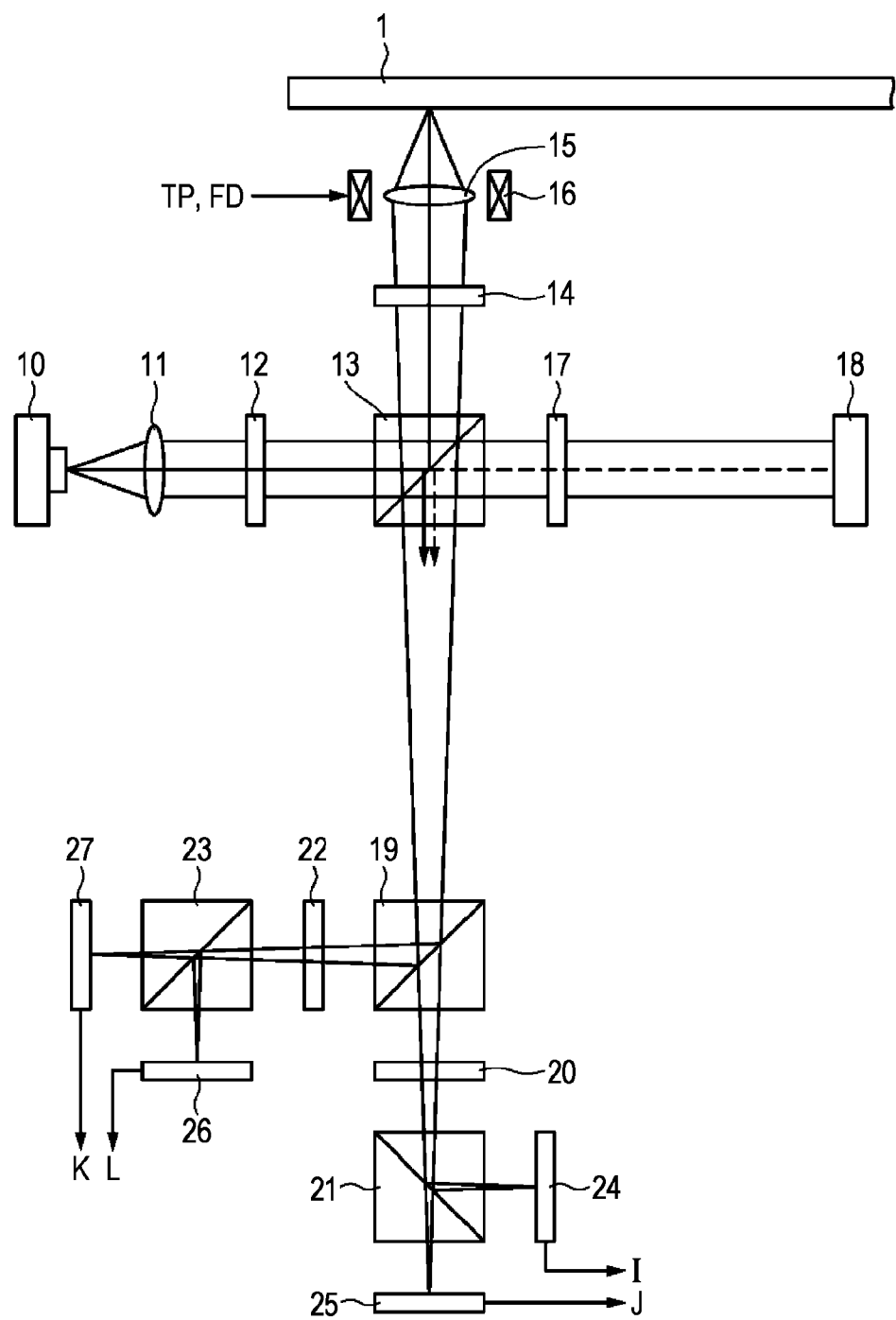
FIG. 1 is a schematic diagram showing a configuration of an optical system used in an embodiment of the present disclosure.

FIG. 1 mainly shows a configuration of an optical system used in the phase diversity system. An optical recording medium 1 is rotatably driven by a spindle motor when mounted in a reproducing apparatus. The optical system is provided with a laser (semiconductor laser) 10 as a laser light source for reproduction. The laser light emitted from the laser 10 is incident on a polarization beam splitter 13 through a half-wave plate 12 after becoming parallel light through a collimation lens 11.

At this time, the polarization beam splitter 13 is configured so as to transmit P polarized light and to reflect S polarized light, for example. A mounting angle (rotation angle around an optical axis inside of an incident surface of the laser light) of the half-wave plate 12 is adjusted so that the ratio (that is, the spectral ratio due to the polarization beam splitter 13) of light, which is output by being transmitted through the polarization beam splitter 13, (P polarized light component) to light, which is reflected and emitted (S polarized light component), becomes almost 1:1.

The laser light reflected by the polarization beam splitter 13 passes through a quarter-wave plate 14, and then is radiated so as to be condensed on a recording layer of the optical recording medium 1 through an objective lens 15 which is held by a two-axis actuator 16.

The objective lens 15 is held by the two-axis actuator 16 so as to be displaceable in a focus direction (direction to be connected to or separated from the optical recording medium 1) and in a tracking direction (radial direction of the optical recording medium 1: a direction orthogonal to the above-described focus direction). The two-axis actuator 16 is provided with a focus coil and a tracking coil to which a focus drive signal FD and a tracking drive signal TD are respectively supplied. The objective lens 15 is displaced in the focus direction and the tracking direction in accordance with the respective focus drive signal FD and tracking drive signal TD.

Reflected light from the recording layer of the optical recording medium 1 is incident on the polarization beam splitter 13 through the objective lens 15 and the quarter-wave plate 14. The polarization direction of the reflected light (backward light) incident on the polarization beam splitter 13 differs from the polarization direction of the light (considered as outward light), which is incident from the laser 10 and is reflected by the polarization beam splitter 13, by 90° through an action caused by the quarter-wave plate 14 and an action occurring while being reflected by the recording layer. That is, the reflected light is incident on the polarization beam splitter 13 as the P polarized light. For this reason, the reflected light is transmitted through the polarization beam splitter 13. Hereinafter, the reflected light which is set to be transmitted through the polarization beam splitter 13 in this way and to which a recording signal of the optical recording medium 1 is applied is called signal light.

In FIG. 1, the laser light (P polarized light) which is emitted from the laser 10 and transmitted through the polarization beam splitter 13 functions as a reference light in the homodyne detection method. The reference light transmitted through the polarization beam splitter 13 passes through a quarter-wave plate 17 in FIG. 1, and then is reflected by a mirror 18 and passes through the quarter-wave plate 17 again to be incident on the polarization beam splitter 13.

Here, the polarization direction of the reference light (backward light) incident on the polarization beam splitter 13 in this way differs (that is, becomes S polarized light) from that of reference light as outward light by 90° through an action caused by the quarter-wave plate 17 and an action occurring while being reflected by the mirror 18. Accordingly, the reference light as backward light is reflected by the polarization beam splitter 13.

In FIG. 1, the reference light reflected by the polarization beam splitter 13 in this way is indicated by a dashed line arrow. In FIG. 1, the signal light transmitted through the polarization beam splitter 13 is indicated by a solid line arrow. The signal light and the reference light are emitted in the same direction in a state of being superposed onto each other due to the polarization beam splitter 13. In specific, in this case, the signal light and the reference light are emitted in the same direction in a state of being superposed onto each other so that the optical axes thereof are coincident with each other. Here, the reference light is so-called coherent light.

The light, which is output from the polarization beam splitter 13 and in which the signal light and the reference light are superposed onto each other, is incident on a half beam splitter 19. The half beam splitter 19 divides the incident light into reflected right and transmitted light at a ratio of almost 1:1.

The light, which is transmitted through the half beam splitter 19 and in which the signal light and the reference light are superposed onto each other, is incident on a polarization beam splitter 21 through a half-wave plate 20. In contrast, the light, which is reflected by the half beam splitter 19 and in which the signal light and the reference light are superposed onto each other, is incident on the polarization beam splitter 23 through a half-wave plate 22.

The half-wave plates 20 and 22 rotate a polarized plane of light. Accordingly, it is possible to adjust the ratio of the amount of light branched by the polarization beam splitter 21 by combining the half-wave plate 20 and the polarization beam splitter 21. Similarly, it is possible to adjust the ratio of the amount of light branched by the polarization beam splitter 23 through the half-wave plate 22.

The ratio of the amounts of light beams, which are respectively branched by the polarization beam splitters 21 and 23, is set to 1:1. Light reflected by the polarization beam splitter 21 is incident on an optical detection unit 24 and light transmitted through the polarization beam splitter 21 is incident on an optical detection unit 25. Light reflected by the polarization beam splitter 23 is incident on an optical detection unit 26 and light transmitted through the polarization beam splitter 23 is incident on an optical detection unit 27.

Figure 2:
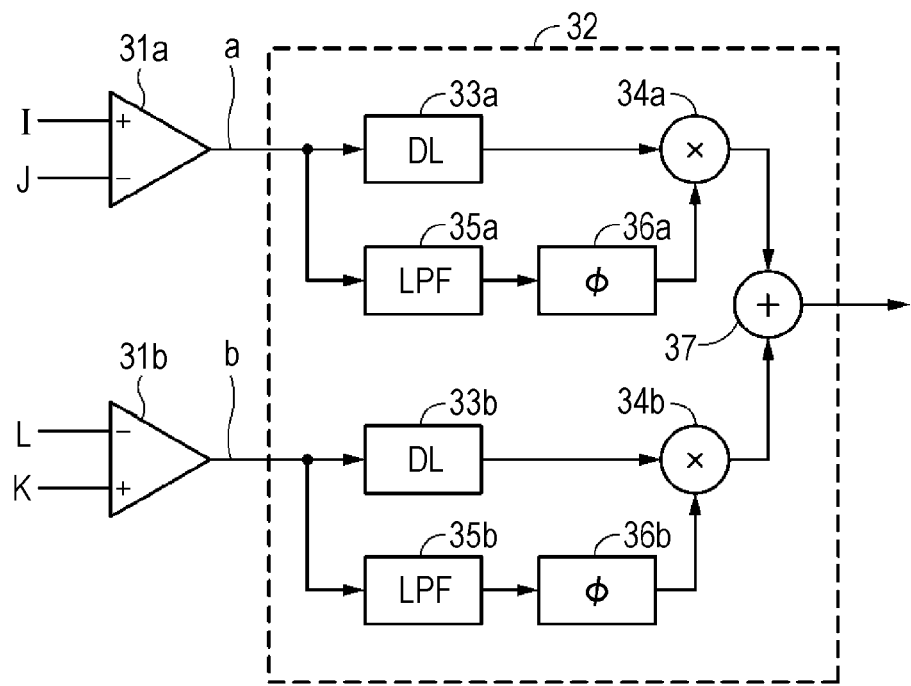
FIG. 2 is a block diagram of a signal generation system of a reproducing apparatus using a phase diversity system.

A light receiving signal output from the optical detection unit 24 is indicated by I, a light receiving signal output from the optical detection unit 25 is indicated by J, a light receiving signal output from the optical detection unit 26 is indicated by L, and a light receiving signal output from the optical detection unit 27 is indicated by K. The light receiving signals I to L are supplied to an arithmetic unit which is configured as shown in FIG. 2.

The arithmetic unit is configured of subtracting circuits 31a and 31b and an arithmetic circuit 32. Light receiving signals I and J are supplied to the subtracting circuit 31a which generates a differential signal a (a=I−J), and the subtracting circuit 31b generates a differential signal b (b=K−L). The differential signal a of the subtracting circuit 31a and the differential signal b of the subtracting circuit 31b are supplied to the arithmetic circuit 32.

The arithmetic circuit 32 has delay circuits 33a and 33b, multiplication circuits 34a and 34b, low pass filters 35a and 35b, offset (ϕ) setting circuits 36a and 36b, and an adding circuit 37. The delay circuit 33a has a delay time equivalent to a delay amount generated in the low pass filter 35a and the offset setting circuit 36a. The delay circuit 33b has a delay time equivalent to a delay amount generated in the low pass filter 35b and the offset (ϕ) setting circuit 36b. The output of the multiplication circuit 34a and the output of the multiplication circuit 34b are supplied to the adding circuit 37. A reproduction signal is extracted from the output of the adding circuit 37.

The above-described reproducing apparatus can obtain the reproduction signal which is not influenced by a phase shift (θ(t)) component of the reference light due to surface deviation of the optical recording medium 1 as will hereinafter be described.

The light receiving signals I to L are represented by the following Equations. The meaning of each item in the expressions is shown as follows.

R: Reference light component

A: Reflective component of mirror surface (land portion) formed on recording surface of optical recording medium f: Modulation component corresponding to presence and absence of pit (positive and negative values are taken)

t: Sampling time

ϕ: Phase equivalent to depth of pit (optical depth) or the like

θ: Optical path length difference between signal light and reference light (mainly generated due to surface deviation of optical recording medium 1)

Figure 3:
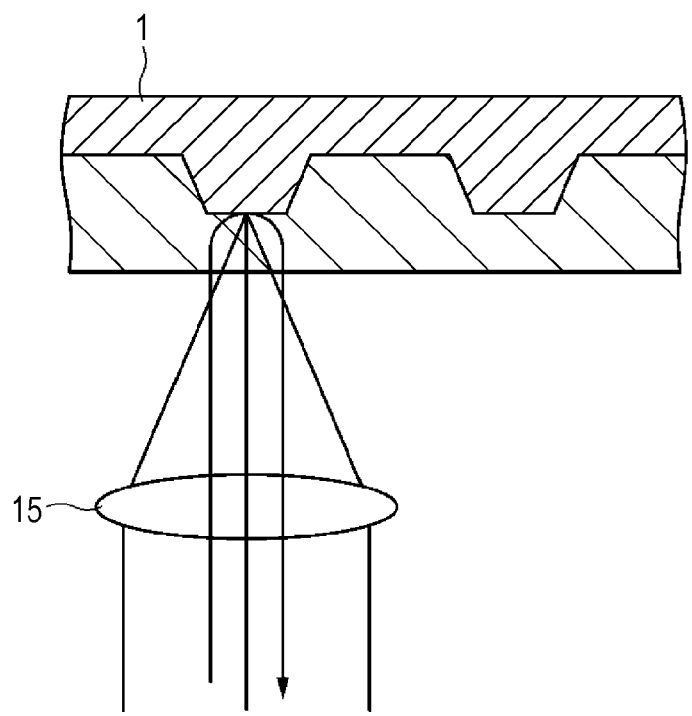
FIG. 3 is a schematic diagram illustrating a reproduction state of an optical recording medium.

When the distance between the objective lens 15 and a signal surface of the optical recording medium 1 is changed by the surface deviation as shown in FIG. 3, the optical wavelength of the signal light changes. In contrast, there is no change in the optical length of the reference light as the reference light is reflected by the mirror 18. As a result, the phase difference between the signal light and the reference light becomes a value which is deviated from the set value. The phase shift component is θ(t).

$$4I=|A+f(t)e^{i\phi}+Re^{i\theta}|^2=(A+f\cos\phi+R\cos\theta)^2+(f\sin\phi+R\sin\theta)^2 \quad (1)$$

$$4J=|A+f(t)e^{i\phi}-Re^{i\theta}|^2=(A+f\cos\phi+R\cos\theta)^2+(f\sin\phi-R\sin\theta)^2 \quad (2)$$

$$4K=|A+f(t)e^{i\phi}+iRe^{i\theta}|^2=(A+f\cos\phi-R\cos\theta)^2+(f\sin\phi+R\cos\theta)^2 \quad (3)$$

$$4L=|A+f(t)e^{i\phi}-iRe^{i\theta}|^2=(A+f\cos\phi+R\cos\theta)^2+(f\sin\phi+R\sin\theta)^2 \quad (4)$$

The differential signal a (=I−J) of subtracting circuit 31a and the differential signal b (=K−L) of the subtracting circuit 31b are represented by the following expressions.

$$a = I - J = (A + f\cos\phi)R\cos\theta + f\sin\phi R\sin\theta \quad (5)$$
$$= AR\cos\theta + fR\cos(\phi - \theta)$$

$$b = K - L = -(A + f\cos\phi)R\sin\theta + f\sin\phi R\cos\theta \quad (6)$$
$$= -AR\sin\theta + fR\sin(\phi - \theta)$$

Figure 4A:
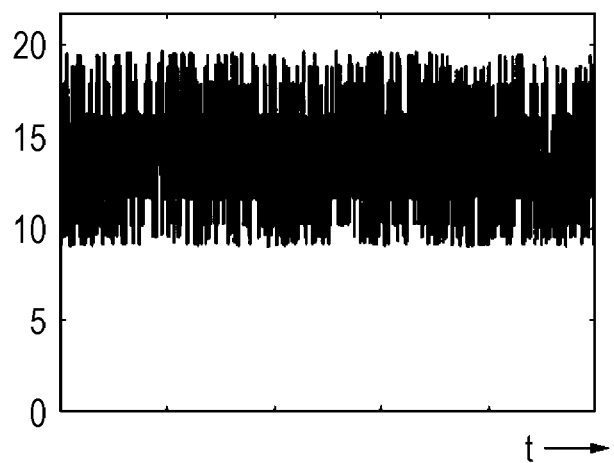
FIGS. 4A to 4C are schematic diagrams illustrating a phase diversity system.

As shown in FIG. 4A, even in a normal detection without performing the homodyne detection, a DC component of the reproduction signal is indicated corresponding to the mirror portion of a background. In a case of performing the homodyne detection, as shown in FIG. 4B, the DC component corresponding to the mirror portion is meandered by the phase θ corresponding to the optical path length difference of the reference light described above.

Figure 4B:
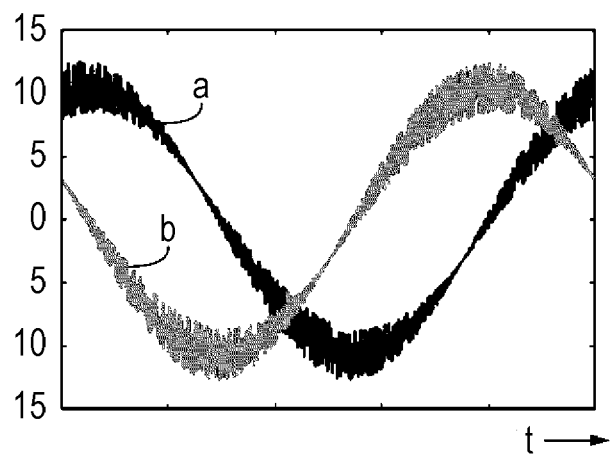
Figure 4C:
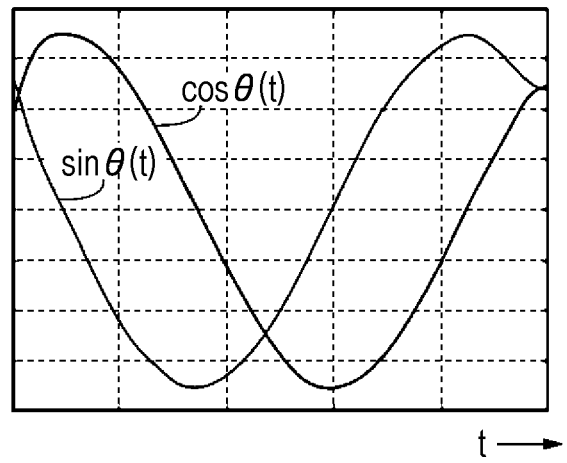

In order to obtain the phase θ, the differential signals a and b shown in FIG. 4B are respectively supplied to the low pass filters 35a and 35b. It is possible to obtain cos θ(t) and sin θ(t) as shown in FIG. 4C using the low pass filters 35a and 35b. That is, in Equations 5 and 6, since f is set as a modulation component corresponding to the presence and absence of a pit (positive and negative values are taken), it is considered that the item in which a function f is multiplied is removed and the items such as sin θ and cos θ remain.

Since the tan θ satisfies (tan θ=sin θ/cos θ), θ is obtained by (arctan θ=θ), ϕ (offset) is set, cos(ϕ−θ(t)) is multiplied by a in the multiplication circuit 34a, and sin(ϕ−θ(t)) is multiplied by b in the multiplication circuit 34b. Then, the multiplication outputs are calculated using the adding circuit 37. The reproduction signal obtained by the adding circuit 37 is represented by the following expression.

$$a\cdot\cos(\phi-\theta(t))+b\cdot\sin(\phi-\theta(t))=f(t)R+AR\cos\phi \quad (7)$$

As can be seen from Equation 7, the component of θ(t) is removed in the reproduction signal and becomes a stable signal. The homodyne detection method also includes a method of canceling the phase difference, which is generated in association with the surface deviation, between the signal light and the reference light by controlling the position of the mirror 18. However, according to the phase diversity system, it is possible to omit such a configuration for controlling the position of the mirror 18. Furthermore, it can be seen that it is possible to obtain the reproduction result in which the component of the signal light is amplified into the reference light. That is, the recording signal of the optical recording medium 1 is amplified and detected, thereby improving SNR in this respect. The term phase diversity system means a system of obtaining the reproduction signal by calculating a sum ($a^2 + b^2$) of squares of the differential signals a and b, or a square root of the sum of squares. In the present specification, the term phase diversity system is used also in the arithmetic operation of multiplying cos(ϕ−θ(t)) by a as described above and multiplying sin(ϕ−θ(t)) in the multiplication circuit 34b.

2. Example of Detection Method

Optical Recording Medium to be Reproduced

Figure 5A:
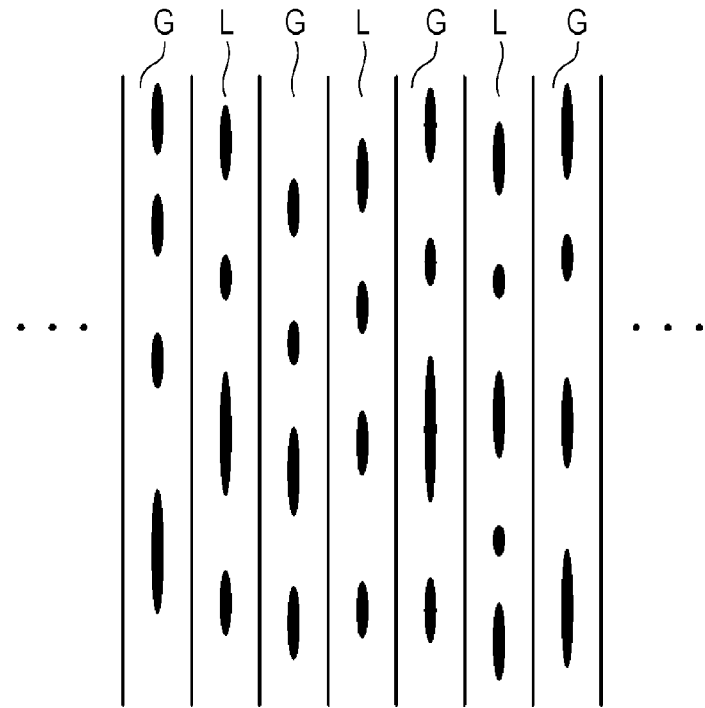
FIGS. 5A and 5B are diagrams illustrating a structure of a recording surface of an optical recording medium to be reproduced.
Figure 5B:
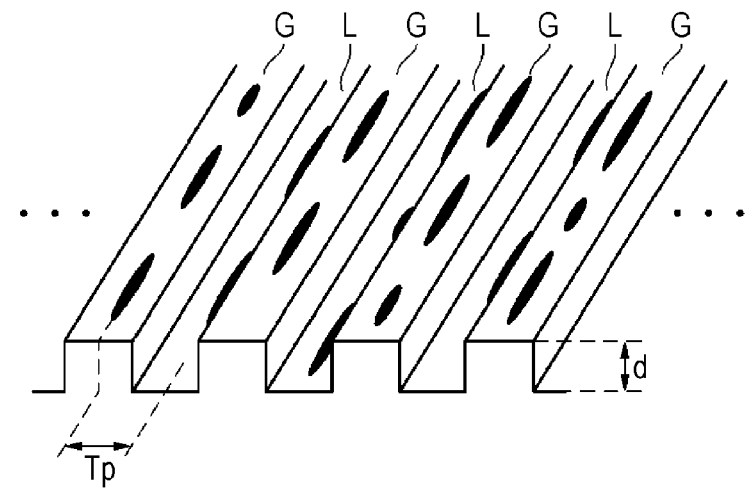

FIGS. 5A and 5B show a structure of the recording surface of an optical recording medium 1 to be reproduced. FIG. 5A is a plan view in which a portion of the recording surface is enlarged and FIG. 5B is a perspective view in which a portion of the recording surface is enlarged. FIG. 5B shows a surface of a side, to which laser light for reproduction is radiated, that is, an upper side of the drawing from which the laser light for reproduction is radiated. A groove G and a land L are formed on the optical recording medium 1. Here, in the present specification, as the same as the case of BD (Blu-ray Disc: registered trademark), a projection side, that is, a side to which the laser light for reproduction first reaches is referred to as a groove G, and a recess side is referred to as a land L.

A pit column with respect to both the groove G and the land L is formed on the optical recording medium 1 to be reproduced in the embodiment of the present disclosure. When the pit column is tracked, the track pitch Tp can be defined as a forming pitch between the land L and the groove G as shown in FIG. 6B. Information recording density is improved by setting the track pitch Tp to a narrow pitch that exceeds an optical threshold value. For example, if it is regarded that a forming pitch of the groove G in the optical recording medium 1 is the same as the track pitch (forming pitch of the pitch column) in the optical recording medium in the related art, the information recording density of the optical recording medium 1 is almost two-fold higher than that in the related art.

The step (appropriately referred to as depth) between the land L and the groove G is represented by d. For example, if the refractive index of the optical recording medium 1 is regarded as n, the depth d is "$\lambda/8/n$". For example, about 33 nm of the depth d is formed under the condition where a reproduction wavelength of $\lambda$ is 405 nm and n is 1.5.

Figure 6A:
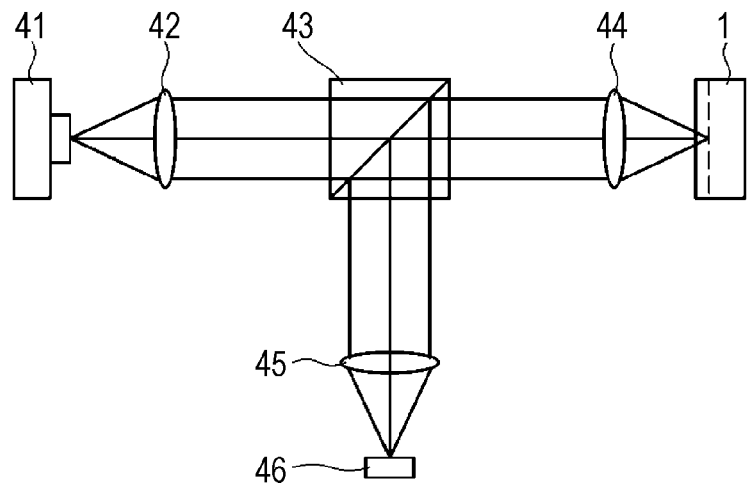
FIG. 6A is a schematic diagram showing an optical system of a simulation and FIG. 6B is a graph showing a result in which the relationship between track pitch and jitter is obtained by the simulation when respective values of steps of a land and a groove are set differently.
Figure 6B:
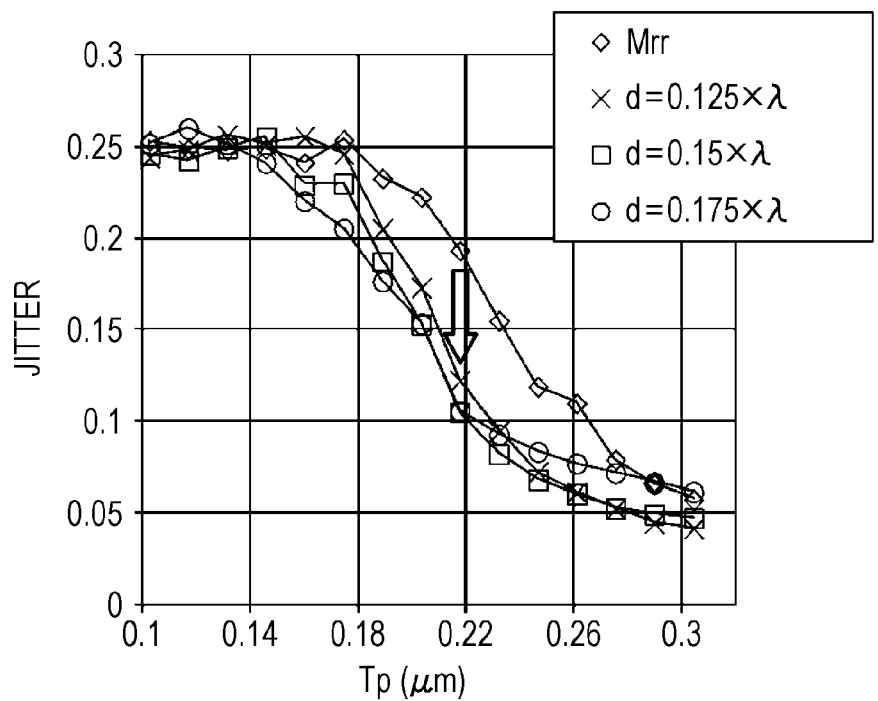

Assuming that the optical recording medium for land and groove recording as described above is reproduced by the optical system shown in FIG. 6A, a result obtained by simulating jitter of a reproduction signal (reproduction signal of the groove or reproduction signal of the land) in a case where the track pitch Tp is changed is shown in the graph of FIG. 6B. The jitter is an example of indexes that represent reproduction performance and any index other than the jitter may be used.

As shown in FIG. 6A, laser light from a laser diode 41 is radiated to the signal surface of the optical recording medium 1 through a lens 42, a polarization beam splitter 43, and an objective lens 44. Reflected light from the signal surface is reflected light by the polarization beam splitter 43 and supplied to an optical detection unit 46 through a lens 45. A reproduction signal is obtained from the optical detection unit 46. The reproducing optical system shown in FIG. 6A may not use the above-described homodyne detection.

A simulation is performed under the following calculation conditions. It is regarded that there is no surface deviation and a reproducing method is used to reduce crosstalk between tracks.

$\lambda$=405 nm, NA=0.85, Rim=65%/65%, Groove duty=50%
Inclination=90°, Mark reflectance=0%, Mark width=0.9 Tp, Linear density=constantly 25 GB The graph shown in FIG. 6B shows changes of the jitter value with respect to the Tp value, regarding (Mrr (meaning a mirror, d=0), (d=0.125$\lambda$), (d=0.15$\lambda$), and (d=0.175$\lambda$)). For example, it is possible to set the jitter to be small in relation to the depth of the groove other than the mirror in (Tp=0.22). Furthermore, it is possible to make the jitter almost unchanged even if the depth of the groove varies.

Figure 7A:
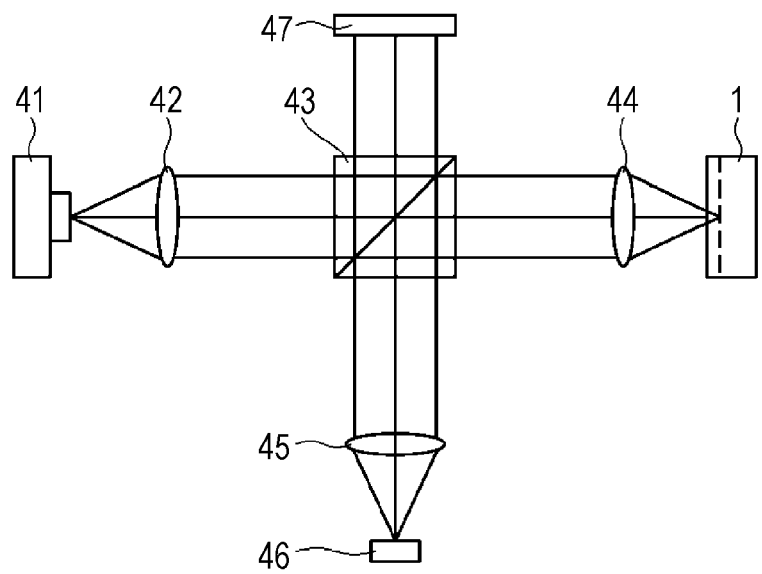
FIG. 7A is a schematic diagram showing an optical system of a simulation and FIG. 7B is a graph showing a result in which the relationship between track pitch and jitter is obtained by the simulation when respective values of steps of a land and a groove are set differently.
Figure 7B:
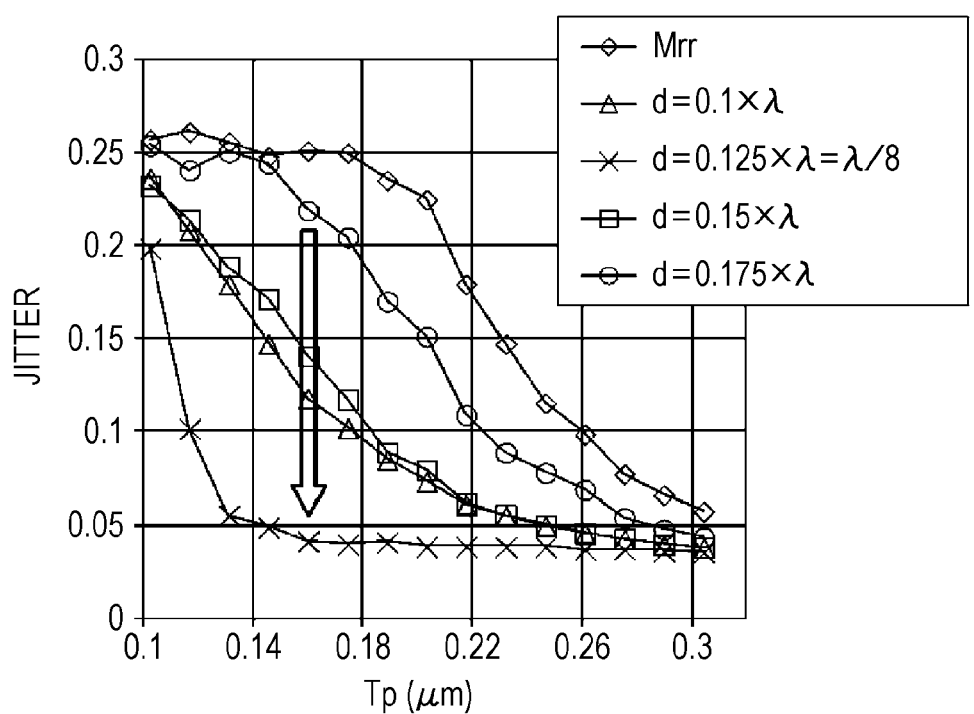

FIGS. 7A and 7B show a result of the simulation when reproducing the optical recording medium 1 for land and groove recording using the homodyne detection. As shown in FIG. 7A, with the provision of mirror 47, the reflected light (signal light) from the optical recording medium 1 and the reflected light (reference light) of the mirror 47 are supplied to the optical detection unit 46 through the lens 45.

A result of the simulation when the optical system shown in FIG. 7A is used is shown in FIG. 7B. The calculation conditions of the simulation are the same as those in FIG. 6B. The graph shown in FIG. 7B shows changes of the jitter value with respect to the Tp value, regarding (Mrr (meaning a mirror, d=0), (d=0.1$\lambda$), (d=0.125$\lambda$=$\lambda$/8), (d=0.15$\lambda$), and (d=0.175$\lambda$)).

For example, it is possible to set the jitter to be small compared to the mirror in (Tp=0.15). However, there is a variation in the change of the value of jitter depending on the value of the depth d. That is, while the jitter can be greatly improved in a case of (d=0.125$\lambda$=$\lambda$/8), the jitter can become too large in a case of (d=0.175$\lambda$). Furthermore, it is difficult to say that the value of the jitter in cases of (d=0.1$\lambda$) and (d=0.15$\lambda$) are sufficiently satisfactory. In a case of d=$\lambda$/8, it is possible to generate the phase difference of 90° between the reproduction signal of the groove and the reproduction signal of the land. Therefore, it is possible to make the crosstalk become small, thereby making the jitter satisfactory.

3. Embodiment of Present Disclosure

As the satisfactory reproduction performance can be obtained only in a case with a certain depth d of the groove, restriction on design of the optical recording medium 1 occurs. Moreover, the value of d=$\lambda$/8 is a comparatively large value and it is difficult to say that the large value is preferable in the surface recording the mark on the lands between the grooves. Furthermore, when d is large, it is difficult to make the surface of the wall of the step without an incline and to clean the surface while molding the optical disk. Accordingly, it is preferable that the d value not be limited to ($\lambda$/8).

Figure 8:
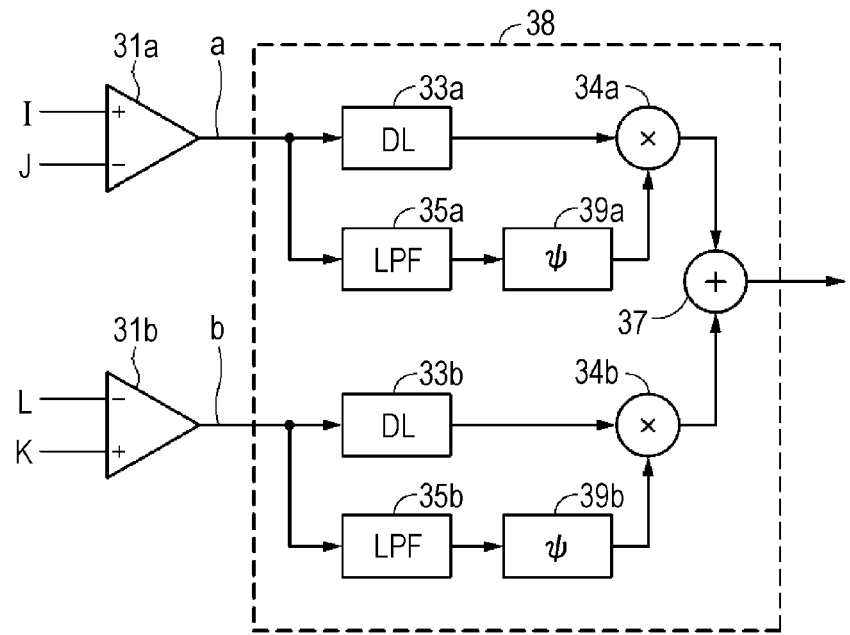
FIG. 8 is a block diagram of a signal generation system of an embodiment of the present disclosure.

In the embodiment of the present disclosure, a reproducing optical system the same as that in FIG. 1 is used and a reproduction signal generation circuit the same as that shown in FIG. 2 is used. The light receiving signals I to L which are output from the respective optical detection units 24 to 27 of FIG. 1 are supplied to the reproduction signal generation circuit having a configuration as shown in FIG. 8.

The reproduction signal generation circuit is configured of subtracting circuits 31a and 31b and an arithmetic circuit 38. The light receiving signals I and J are supplied to the subtracting circuit 31a which generates a differential signal a (a=I−J), and the subtracting circuit 31b generates a differential signal b (b=K−L). The differential signal a of the subtracting circuit 31a and the differential signal b of the subtracting circuit 31b are supplied to the arithmetic circuit 38.

The arithmetic circuit 38 has delay circuits 33a and 33b, multiplication circuits 34a and 34b, low pass filters 35a and 35b, offset ($\psi$) setting circuits 39a and 39b, and an adding circuit 37. The delay circuit 33a has a delay time equivalent to a delay amount generated in the low pass filter 35a and the offset ($\psi$) setting circuit 39a. The delay circuit 33b has a delay time equivalent to a delay amount generated in the low pass filter 35b and the offset ($\psi$) setting circuit 39b. The output of the multiplication circuit 34a and the output of the multiplication circuit 34b are supplied to the adding circuit 37. A reproduction signal is extracted from the output of the adding circuit 37.

The offset ($\psi$) setting circuits 39a and 39b are offsets of the phases depending on the depth d, that is, the step between the groove G and the land L as disclosed in the following. The value of the depth d of the optical recording medium 1 to be reproduced is obtained in advance. Therefore, it is possible to set the offset $\psi$.

In the above-described embodiment of the present disclosure, as will hereinafter be described, it is possible to obtain a reproduction signal which is not influenced by a phase shift ($\theta(t)$) component of the reference light due to surface deviation of the optical recording medium 1 and from which the crosstalk between the tracks is removed.

Figure 9:
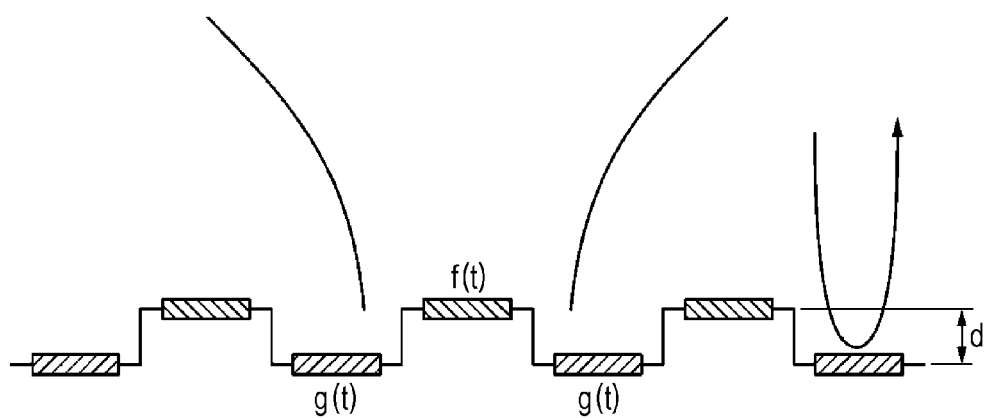
FIG. 9 is a schematic diagram used for illustrating a reproduction state of an embodiment of the present disclosure.

In the land and groove recording system, if the track pitch is narrowed, crosstalk is generated from an adjacent track. As shown in FIG. 9, when reproducing the groove, not only a reproduction signal f(t) of a groove, but also a reproduction signal g(t) of an adjacent land are mixed. When the phase $\phi$ of the reproduction signal of the groove is 0, the phase $\psi$ of the land becomes $4\pi nd/\lambda$ ($\lambda$ is a wavelength and n is a refractive index of the substrate of the optical recording medium 1).

The light receiving signals I to L are obtained using the reproduction optical system shown in FIG. 1. The meaning of each item in the expressions is shown as follows similarly to the case of the above-described Equations.

R: Reference light component
A: Reflective component of mirror surface (land portion) formed on recording surface of optical recording medium
  f: Modulation component corresponding to presence and absence of pit
  g: Crosstalk component from adjacent track
  t: Sampling time
  $\phi$: Phase equivalent to depth of pit (optical depth) or the like
  $\theta$: Optical path length difference between signal light and reference light (mainly generated due to surface deviation of optical recording medium 1)

$$4I = |A + f(t)e^{i\phi} + g(t)e^{i\psi} + Re^{i\theta}|^2 \quad (8)$$
$$= (A + f\cos\phi + g\cos\psi + R\cos\theta)^2 +$$
$$(f\sin\phi + g\sin\psi + R\sin\theta)^2$$

$$4J = |A + f(t)e^{i\phi} + g(t)e^{i\psi} - Re^{i\theta}|^2 \quad (9)$$
$$= (A + f\cos\phi + g\cos\psi - R\cos\theta)^2 +$$
$$(f\sin\phi + g\sin\psi - R\sin\theta)^2$$

$$4K = |A + f(t)e^{i\phi} + g(t)e^{i\psi} + iRe^{i\theta}|^2 \quad (10)$$
$$= (A + f\cos\phi + g\cos\psi - R\sin\theta)^2 +$$
$$(f\sin\phi + g\sin\psi + R\cos\theta)^2$$

$$4L = |A + f(t)e^{i\phi} + g(t)e^{i\psi} - iRe^{i\theta}|^2 \quad (11)$$
$$= (A + f\cos\phi + g\cos\psi + R\sin\theta)^2 +$$
$$(f\sin\phi + g\sin\psi - R\cos\theta)^2$$

Furthermore, an arithmetic operation is performed using the reproduction signal generation circuit shown in FIG. 8. The differential signal a (=I−J) of the subtracting circuit 31a and the differential signal b (=K−L) of the subtracting circuit 31b are represented by the following expressions.

$$a = I - J = (A + f\cos\phi + g\cos\psi)R\cos\theta + \quad (12)$$
$$(f\sin\phi + g\sin\psi)R\sin\theta$$
$$= AR\cos\theta + fR\cos(\phi - \theta) + gR\cos(\psi - \theta)$$

$$b = K - L = -(A + f\cos\phi + g\cos\psi)R\sin\theta + \quad (13)$$
$$(f\sin\phi + g\sin\psi)R\cos\theta$$
$$= -AR\sin\theta + fR\sin(\phi - \theta) + gR\sin(\psi - \theta)$$

As described above, cos $\theta(t)$ and sin $\theta(t)$ are obtained using the low pass filters 35a and 35b. That is, in Equations 12 and 13, since f is set as a modulation component corresponding to the presence and absence of a pit (positive and negative values are taken), it is considered that the item in which functions f and g are multiplied is removed and the items such as sin $\theta$ and cos $\theta$ remain since g is the crosstalk component from the adjacent track. Since tan $\theta$ is sin $\theta$/cos $\theta$, $\theta$ is obtained by (arctan $\theta=\theta$), $\psi$ (offset) is set through the offset ($\psi$) setting circuits 39a and 39b, $\sin(\psi-\theta(t))$ is multiplied by a in the multiplication circuit 34a, and $\cos(\psi-\theta(t))$ is multiplied by b in the multiplication circuit 34b.

Then, the multiplication outputs are calculated using the adding circuit 37. The reproduction signal obtained from the adding circuit 37 is as the following expression.

$$a \times \sin(\psi - \theta(t)) - b \times \cos(\psi - \theta(t)) = \quad (14)$$
$$AR\cos\theta\sin(\psi - \theta) + AR\sin\theta\cos(\psi - \theta) + fR\cos(\phi - \theta)\sin(\psi - \theta) -$$
$$fR\sin(\phi - \theta)\cos(\psi - \theta) = f(t)R\sin(\psi - \phi) + AR\sin\psi$$

As shown in Equation 14, the $\theta(t)$ component is removed from the reproduction signal, thereby the signal becomes stable. In addition, a reproduction signal component g(t) of an adjacent track is not included in the reproduction signal and crosstalk between tracks is removed. The reproduction signal may be obtained by calculating a sum ($a^2+b^2$) of squares of the differential signals a and b, or a square root of the sum of squares.

Figure 10:
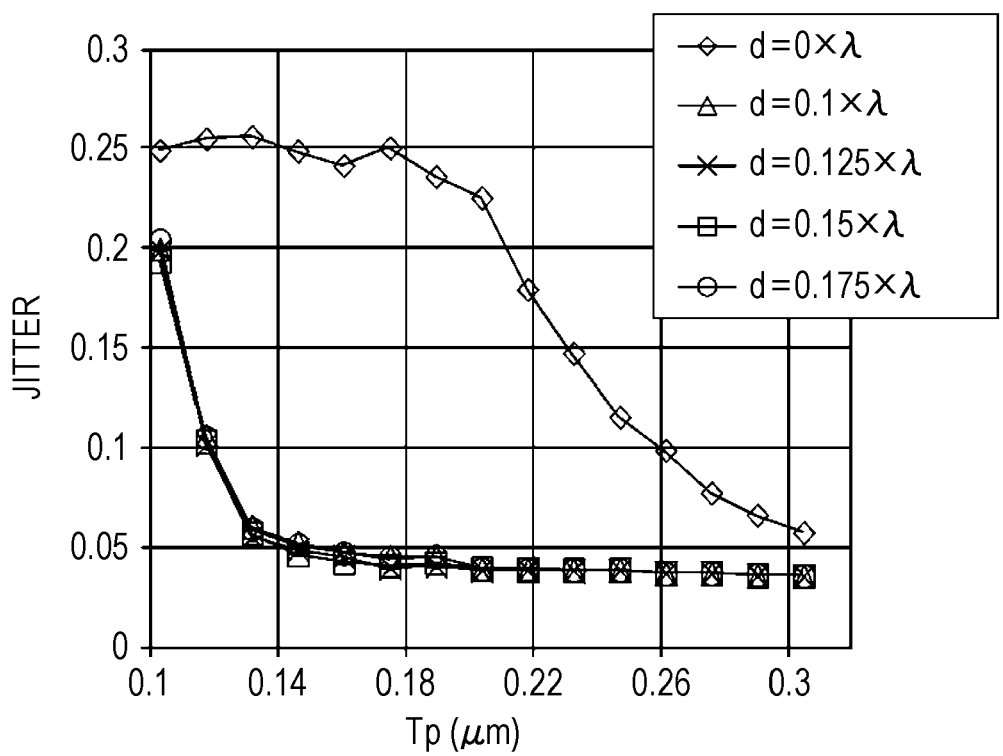
FIG. 10 is a graph showing a result in which the relationship between track pitch and jitter in an embodiment of the present disclosure is obtained by a simulation.

A result of the simulation when the optical system the same as that shown in FIG. 7A is used is shown in FIG. 10. The calculation conditions of the simulation are the same as those in FIGS. 6B and 7B. The graph shown in FIG. 10 shows changes of the jitter value with respect to the Tp value, regarding (Mrr (meaning a mirror, d=0), (d=0.1$\lambda$), (d=0.125$\lambda=\lambda/8$), (d=0.15$\lambda$), and (d=0.175$\lambda$)).

As can be seen from the graph of FIG. 10, it is possible to set the jitter to be small in relation to all of the d values other than the mirror. While the jitter can be greatly improved only in a case of (d=0.125$\lambda=\lambda/8$) in the case of the above-described FIG. 7B, the jitter can be improved similarly even in a case where the d value is in other ranges in the embodiment of the present disclosure.

The present disclosure can also take the following configurations.

(1) A reproducing apparatus including:

an optical system that obtains a signal light, to which both recording signals of a land and a groove are applied, by radiating light emitted from a light source and generates a reference light from the light emitted from the light source, with respect to a recording medium in which the signals are recorded in both the land and the groove, and that generates a first group, the phase difference of which is given by almost 0°, of the signal light and the reference light, a second group, the phase difference of which is given by almost 180°, of the signal light and the reference light, a third group, the phase difference of which is given by almost 90°, of the signal light and the reference light, and a fourth group, the phase difference of which is given by almost 270°, of the signal light and the reference light, with respect to the superposed light in which the signal light and the reference light are superposed onto each other;

a light receiving unit that receives light of the first group of the signal light and the reference light through a first light receiving element, light of the second group of the signal light and the reference light through a second light receiving element, light of the third group of the signal light and the reference light through a third light receiving element, and light of the fourth group of the signal light and the reference light through a fourth light receiving element; and a reproduction signal generation circuit that calculates a first differential signal which is a difference between a first light receiving signal obtained from the first light receiving element and a second light receiving signal obtained from the second light receiving element, and a second differential signal which is a difference between a third light receiving signal obtained from the third light receiving element and a fourth light receiving signal obtained from the fourth light receiving element, and that generates a reproduction signal from which phase deviation of the reference light and phase offset of a value corresponding to a step between the land and the groove are removed, by performing an arithmetic operation using the first differential signal and the second differential signal.

(2) The reproducing apparatus according to (1), in which the reference light is generated by reflecting the light emitted from the light source using a mirror.

(3) The reproducing apparatus according to any one of (1) and (2), in which when a first low frequency signal as a signal, from which a low frequency component of the first differential signal is extracted, is set as cos θ and a second low frequency signal as a signal, from which a low frequency component of the second differential signal is extracted, is set as sin θ, the reproduction signal generation circuit obtains a value of phase deviation θ between the signal light and the reference light by calculating arctan θ and performs arithmetic operation using the θ value and the phase offset.

(4) The reproducing apparatus according to any one of (1) to (3), in which the phase offset is almost equivalent to ($\psi$=4πnd/λ) (n is a refractive index, d is the step between the land and the group, and λ is a wavelength of light).

(5) The reproducing apparatus according to any one of (1) to (4), in which when the value of the first differential signal is set as a and the value of the second differential signal is set as b, the reproduction signal generation circuit obtains the reproduction signal by performing an arithmetic operation of $a \cdot \sin(\psi-\theta(t))-b \cdot \cos(\psi-\theta(t))$.

(6) A reproducing method including: obtaining a signal light, to which both recording signals of a land and a groove are applied, by radiating light emitted from a light source and generating a reference light from the light emitted from the light source, with respect to a recording medium in which the signals are recorded in both the land and the groove, and generating a first group, the phase difference of which is given by almost 0°, of the signal light and the reference light, a second group, the phase difference of which is given by almost 180°, of the signal light and the reference light, a third group, the phase difference of which is given by almost 90°, of the signal light and the reference light, and a fourth group, the phase difference of which is given by almost 270°, of the signal light and the reference light, with respect to the superposed light in which the signal light and the reference light are superposed onto each other, using an optical system;

receiving light of the first group of the signal light and the reference light through a first light receiving element, light of the second group of the signal light and the reference light through a second light receiving element, light of the third group of the signal light and the reference light through a third light receiving element, and light of the fourth group of the signal light and the reference light through a fourth light receiving element; and calculating a first differential signal which is a difference between a first light receiving signal obtained from the first light receiving element and a second light receiving signal obtained from the second light receiving element, and a second differential signal which is a difference between a third light receiving signal obtained from the third light receiving element and a fourth light receiving signal obtained from the fourth light receiving element, and generating a reproduction signal from which phase deviation of the reference light and phase offset of a value corresponding to a step between the land and the groove are removed, by performing an arithmetic operation using the first differential signal and the second differential signal.

4. Modification Example

Hereinabove, the embodiments of the present disclosure have been described in detail. However, the present disclosure is not limited to the above-described embodiments and various modifications can be made based on technical ideas of the present disclosure. For example, the wavelength of the laser light source may be in ranges other than 405 nm. Furthermore, it is possible to use a method of optically setting a phase with respect to light without being limited to electrical signal processing as a configuration for setting phase offset. For example, a feedback control that changes the position of the mirror 18 using an actuator may be performed so that the reproduction signal is maximized.

Furthermore, the reproducing optical system is not limited to the configuration shown in FIG. 1. For example, a homodyne detection optical system may be used in order to obtain the four kinds of light receiving signals I to L. The homodyne detection optical system has a Wollaston prism and can generate light having each of the phase differences of 0°, 90°, 180°, and 270°.

In addition, the configuration, the method, the process, the shape, the material, and the numerical value of the above-described embodiments can be combined with each other as long as the combinations do not depart from the gist of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:
1. A reproducing apparatus comprising:
an optical system that obtains a signal light, to which both recording signals of a land and a groove are applied, by radiating light emitted from a light source and generates a reference light from the light emitted from the light source, with respect to a recording medium in which the signals are recorded in both the land and the groove, and that generates a first group, the phase difference of which is given by almost 0°, of the signal light and the reference light, a second group, the phase difference of which is given by almost 180°, of the signal light and the reference light, a third group, the phase difference of which is given by almost 90°, of the signal light and the reference light, and a fourth group, the phase difference of which is given by almost 270°, of the signal light and the reference light, with respect to the superposed light in which the signal light and the reference light are superposed onto each other;
a light receiving unit that receives light of the first group of the signal light and the reference light through a first light receiving element, light of the second group of the signal light and the reference light through a second light receiving element, light of the third group of the signal light and the reference light through a third light receiv- ing element, and light of the fourth group of the signal light and the reference light through a fourth light receiving element; and a reproduction signal generation circuit that calculates a first differential signal which is a difference between a first light receiving signal obtained from the first light receiving element and a second light receiving signal obtained from the second light receiving element, and a second differential signal which is a difference between a third light receiving signal obtained from the third light receiving element and a fourth light receiving signal obtained from the fourth light receiving element, and that generates a reproduction signal from which phase deviation of the reference light and phase offset of a value corresponding to a step between the land and the groove are removed, by performing an arithmetic operation using the first differential signal and the second differential signal, wherein the phase offset is proportional to a refractive index of the recording medium and inversely proportional to a wavelength of the light emitted from the light source.

2. The reproducing apparatus according to claim 1, wherein the reference light is generated by reflecting the light emitted from the light source using a mirror.

3. The reproducing apparatus according to claim 1, wherein when a first low frequency signal as a signal, from which a low frequency component of the first differential signal is extracted, is set as $\cos\theta$ and a second low frequency signal as a signal, from which a low frequency component of the second differential signal is extracted, is set as $\sin\theta$, the reproduction signal generation circuit obtains a value of phase deviation $\theta$ between the signal light and the reference light by calculating $\arctan\theta$ and performs arithmetic operation using the $\theta$ value and the phase offset.

4. The reproducing apparatus according to claim 3, wherein the phase offset is almost equivalent to ($\psi=4\pi nd/\lambda$) (n is a refractive index, d is the step between the land and the groove, and $\lambda$ is a wavelength of the light).

5. The reproducing apparatus according to claim 4, wherein when the value of the first differential signal is set as a and the value of the second differential signal is set as b, the reproduction signal generation circuit obtains the reproduction signal by performing an arithmetic operation of $a\cdot\sin(\psi-\theta(t))-b\cdot\cos(\psi-\theta(t))$.

6. A reproducing method comprising:

obtaining a signal light, to which both recording signals of a land and a groove are applied, by radiating light emitted from a light source and generating a reference light from the light emitted from the light source, with respect to a recording medium in which the signals are recorded in both the land and the groove, and generating a first group, the phase difference of which is given by almost 0°, of the signal light and the reference light, a second group, the phase difference of which is given by almost 180°, of the signal light and the reference light, a third group, the phase difference of which is given by almost 90°, of the signal light and the reference light, and a fourth group, the phase difference of which is given by almost 270°, of the signal light and the reference light, with respect to the superposed light in which the signal light and the reference light are superposed onto each other, using an optical system;

receiving light of the first group of the signal light and the reference light through a first light receiving element, light of the second group of the signal light and the reference light through a second light receiving element, light of the third group of the signal light and the reference light through a third light receiving element, and light of the fourth group of the signal light and the reference light through a fourth light receiving element; and calculating a first differential signal which is a difference between a first light receiving signal obtained from the first light receiving element and a second light receiving signal obtained from the second light receiving element, and a second differential signal which is a difference between a third light receiving signal obtained from the third light receiving element and a fourth light receiving signal obtained from the fourth light receiving element, and generating a reproduction signal from which phase deviation of the reference light and phase offset of a value corresponding to a step between the land and the groove are removed, by performing an arithmetic operation using the first differential signal and the second differential signal, wherein the phase offset is proportional to a refractive index of the recording medium and inversely proportional to a wavelength of the light emitted from the light source.

7. The reproducing apparatus according to claim 2, wherein a position of the mirror is controlled using an actuator based on a feedback control signal to maximize the reproduction signal.

8. The reproducing method according to claim 6, wherein the reference light is generated by reflecting the light emitted from the light source using a mirror.

9. The reproducing method according to claim 8, wherein a position of the mirror is controlled using an actuator based on a feedback control signal to maximize the reproduction signal.

* * * * *